Oct. 11, 1960   N. W. BUOYMASTER ET AL   2,955,895
CARDIOGRAPH STYLUS CALIBRATIONS
Filed Jan. 2, 1958
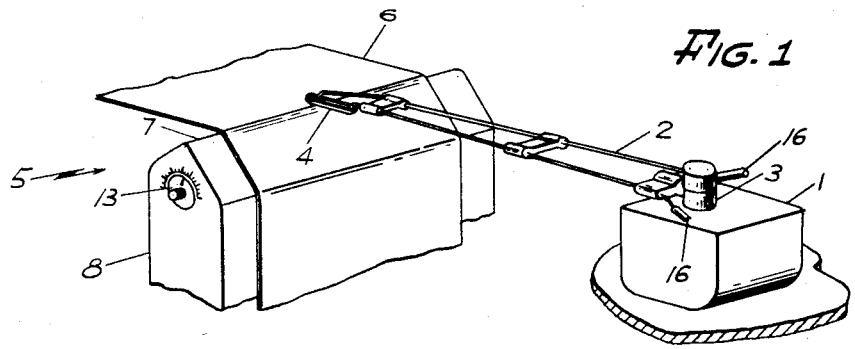
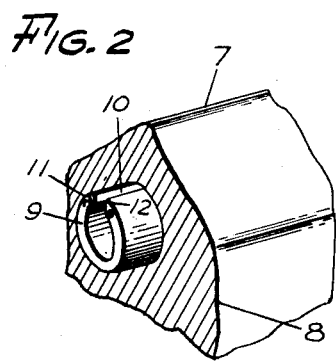 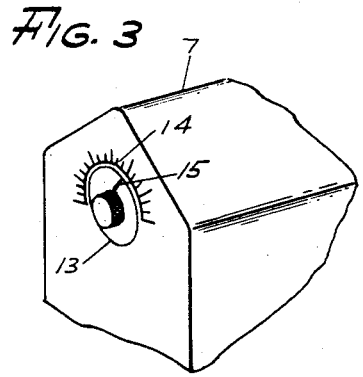
INVENTORS
NED W. BUOYMASTER
DUANE B. HAAGENSEN
BY Elmer J. Gorn
ATTORNEY

United States Patent Office 2,955,895
Patented Oct. 11, 1960

2,955,895
CARDIOGRAPH STYLUS CALIBRATIONS

Ned W. Buoymaster, Severna Park, Md., and Duane B. Haagensen, Philadelphia, Pa., assignors, by mesne assignments, to Cardiotron Electro Medical Laboratories, Inc., Bay Shore, N.Y., a corporation of New York Filed Jan. 2, 1958, Ser. No. 706,783

4 Claims. (Cl. 346—76)

This invention relates generally to stylus-type recording systems and in particular to a means for calibrating the pressure of said stylus on recording paper.

In cardiographs or similar recording devices, the stylus used to generate the recorded lines on recording paper accomplishes said recording by means of a scraping action on the paper's coating material due to pressure and by means of heat whereby the stylus is heated externally. It becomes necessary to adjust the pressure of the stylus tip on the recording paper in accordance with the type of paper and stylus used to obtain a recorded line of a particularly desired firmness or width. Previous to this invention such pressure adjustment has been accomplished by varying the position of a spring-mounted galvanometer to which the stylus is attached and which is used to produce the stylus deflection. A system whereby a galvanometer, which may weigh approximately six pounds, is adjusted to obtain a pressure of only a few grams at the stylus tip is a crude and relatively cumbersome method and easy or accurate calibration is not readily available. This invention, however, provides a simple, inexpensive pressure adjustment system that operates on the magnetic properties of the tip of the stylus and does away with the need for setting up the galvanometer on a spring mounted arrangement with elaborate tension-adjust mechanisms.

The invention provides a rotatable magnet along the length of and underneath the paper carrier edge upon which the stylus tip rests. The magnet is provided with a predetermined air gap so that a predetermined maximum magnetic field exists within the vicinity of the air gap. When the air gap is directly underneath the stylus the maximum pressure is obtained. As the magnet is rotated and the air gap moves away from the stylus, the pressure decreases until a point is reached at which the magnetic field in the vicinity of the stylus has diminished sufficiently so as to have essentially no effect on the stylus. When that point is reached the pressure of the stylus upon the paper is determined solely by the weight of the stylus tip as it rests against the recording edge. Markings are provided on the paper carrier structure in the vicinity of the periphery of the magnet. These markings correspond to predetermined pressure calibration points and allow the stylus pressure to be set by rotating the magnet to an appropriately marked position.

A better understanding of the invention may be obtained with the help of the drawing in which:

Fig. 1 shows a portion of the recording system in which the invention is used;

Fig. 2 shows a more detailed description of the invention; and

Fig. 3 shows another portion of the invention.

In Fig. 1 galvanometer 1 is shown mounted in a fixed position. A stylus 2 is attached to the rotating arm 3 of the galvanometer and projects outward from the galvanometer so that the tip 4 of the stylus is in a position to be used in the paper carrier system 5 of the recording set up. For the particular application shown here the recording paper 6 is driven by suitable means (not shown) so as to pass over the sharp edged surface 7 of a paper carrier structure 8 which may be made of aluminum. Heating wires 16 are adapted to supply current for heating the stylus. The stylus tip rests on the paper at a point along the sharp edged surface 7 determined by the galvanometer deflection system and when no magnetic field is present the tip rests on the surface at a pressure determined solely by its own weight. Fig. 2 shows a magnet 9 in the shape of a hollow cylinder with an air gap 10 that is inserted in a circular channel cut along the length of the paper carrier structure 8. The length of the magnet faces and the air gap 10 between said faces are approximately equal to the width of the paper 6. The magnet is adapted so that it can be rotated within the channel. The magnet is situated in the structure 8 directly underneath the surface 7, as shown in Fig. 2, with the north and south poles 11 and 12 respectively at either side of air gap 10. Attached to the magnet 9 is a dial 13 shown in Fig. 1 that can be rotated by hand and which in turn rotates the magnet 9 within the channel. For the sake of simplicity the dial is not shown in Fig. 2.

The maximum magnetic field exists in the air gap and when the air gap is at a position directly below the stylus tip, as shown in Fig. 2, a maximum force exists on the stylus tip to provide a maximum pressure of the stylus on the paper at the surface 7. The amount of this pressure is determined by the magnetic field strength in the vicinity of the stylus and can be arranged for a particular predetermined amount. As the magnet is rotated either clockwise or counterclockwise the magnetic field strength is negligible. This point is reached when the magnet has been rotated approximately 60° from its position at maximum pressure. In Fig. 3 are shown calibrated dial markings 14 which are placed around the periphery of the dial on the paper carrier structure 8 and an appropriate arrow 15 which is placed on the dial 13 so that the operator may line up the arrow opposite a marking corresponding to a desired pressure. Thus, an easy, inexpensive apparatus is available for calibrating the pressure of the stylus tip on the recording paper.

Since the stylus used records by means of heating as well as pressure, there is a possibility that the stylus tip may become too hot for proper operation with the paper and under such conditions it becomes desirable to reduce the pressure that exists. Another advantage of applicant's invention lies in the fact that if the stylus becomes so hot that the Curie point of the stylus material is reached and the material thereby becomes non-magnetic, the pressure on the paper is automatically reduced and the system acts as an automatic tension pickup.

In the invention the magnet need not be necessarily cylindrical in shape nor must the calibration markings be shown. Hence, this invention is not to be limited to the particular embodiments herein described and shown in the drawing except as herein defined in the following claims.

What is claimed is:

1. A pressure calibrating device comprising paper-carrying means including structural means having a surface over which recording paper passes in contact with said surface, channel magnet means mounted within said structural means for providing a magnetic force along the length of said surface, means connected to said magnet means for rotating said magnet means to control the strength of said magnetic force along said surface, and a stylus having a magnetic tip at one end, said stylus connected at the other end to a galvanometer and said tip resting on said paper-covered surface.

2. A pressure calibrating device comprising paper-carrying means including structural means having a surface over which recording paper passes in contact with said surface, channel magnet means including an air gap of predetermined size mounted within said structural means for providing a magnetic force along the length of said surface, means connected to said magnet means for rotating said magnet means to control the strength of said magnetic force along said surface, and a stylus having a magnetic tip at one end, said stylus connected at the other end to a galvanometer and said tip resting on said paper-covered surface.

3. A pressure calibrating device comprising paper-carrying means including structural means having a surface over which recording paper passes in contact with said surface, channel magnet means mounted within said structural means for providing a magnetic force along the length of said surface, dial means connected to said magnet means for rotating said magnet means to control the strength of said magnetic force along said surface, a stylus having a magnetic tip at one end, said stylus connected at the other end to a galvanometer and said tip resting on said paper-covered surface, and calibration markings on said dial means and on said structural means whereby predetermined positions of said magnet may be indicated as said magnet is rotated to correspond to predetermined strengths of said magnetic force.

4. A pressure calibrating device comprising paper-carrying means including structural means having a surface over which recording paper passes in contact with said surface, channel magnet means mounted within said structural means for providing a magnetic force along the length of said surface, means connected to said magnet means for rotating said magnet means to control the strength of said magnetic force along said surface, and a stylus connected to heating means and having a magnetic tip at one end, said stylus connected at the other end to a galvanometer and said tip resting on said paper-covered surface, whereby said stylus is rendered insensitive to said magnetic force when the temperature of said stylus reaches a predetermined value.

References Cited in the file of this patent

UNITED STATES PATENTS

| | | |
|---|---|---|
| 1,344,186 | Morrison | June 22, 1920 |
| 2,539,784 | Kleber | Jan. 30, 1951 |
| 2,591,138 | Cooley | Apr. 1, 1952 |
| 2,602,016 | Goldsmith | July 1, 1952 |
| 2,777,747 | Gilson et al. | Jan. 15, 1957 |